(12) United States Patent
Barstad et al.

(10) Patent No.: US 9,652,732 B1
(45) Date of Patent: May 16, 2017

(54) PROCESSING A RETURN REQUEST

(75) Inventors: David Barstad, St. Louis Park, MN (US); Thomas William Branham, Lake Elmo, MN (US); Julie Lynne Wegmiller, Edina, MN (US); Jamie Ann Person, Ham Lake, MN (US); Lara Erpelding, Minnetonka, MN (US); Jayachandran Chandrashekaran, Shakopee, MN (US); Koteswara R. Silla, Eden Prairie, MN (US); Sreeraj Balakrishnan, Woodbury, MN (US)

(73) Assignee: Target Brands, Inc., Minneapolis, MN (US)

( * ) Notice: Subject to any disclaimer, the term of this patent is extended or adjusted under 35 U.S.C. 154(b) by 1310 days.

(21) Appl. No.: 12/613,210

(22) Filed: Nov. 5, 2009

(51) Int. Cl.
*G06Q 10/08* (2012.01)
*G06Q 30/06* (2012.01)

(52) U.S. Cl.
CPC ......... *G06Q 10/0837* (2013.01); *G06Q 30/06* (2013.01)

(58) Field of Classification Search
None
See application file for complete search history.

(56) References Cited

U.S. PATENT DOCUMENTS

| | | | |
|---|---|---|---|
| 6,070,147 A | 5/2000 | Harms et al. | |
| 6,115,690 A | 9/2000 | Wong | |
| 6,119,933 A | 9/2000 | Wong et al. | |
| 6,970,826 B2 | 11/2005 | Christensen et al. | |
| 7,013,292 B1 | 3/2006 | Hsu et al. | |
| 7,455,226 B1* | 11/2008 | Hammond et al. | 235/385 |
| 8,025,229 B2* | 9/2011 | Hammond et al. | 235/385 |
| 2002/0133425 A1 | 9/2002 | Pederson et al. | |
| 2002/0188531 A1 | 12/2002 | Junger | |
| 2003/0225625 A1 | 12/2003 | Chew et al. | |
| 2004/0172260 A1 | 9/2004 | Junger et al. | |
| 2006/0149577 A1* | 7/2006 | Stashluk et al. | 705/1 |
| 2009/0048934 A1 | 2/2009 | Haddad et al. | |
| 2009/0076870 A1* | 3/2009 | Hammond et al. | 705/7 |

* cited by examiner

*Primary Examiner* — H Rojas
(74) *Attorney, Agent, or Firm* — Nixon & Vanderhye P.C.

(57) ABSTRACT

In one embodiment, a point of return device can be configured to gather information related to a return request and a returning customer. Upon providing the information to an authorization server, the server can identify historical transaction data of the returning customer from data stored in a repository. Based on the historical transaction data and on the return request, the authorization server determines a return authorization decision based on an item-level return policy, another decision based on customer-specific return privileges, and optionally, another authorization decision based on registry-related return privileges. Upon processing the return request based on a selected return authorization decision, data representative of the processed return request is optionally stored in the repository to update the previously identified customer transaction data.

9 Claims, 6 Drawing Sheets

PROCESSING A RETURN REQUEST

BACKGROUND

In a retail environment, a customer purchases products from a merchant at a point of sale device (e.g., a register configured for handling sales), generally operated by a store employee. Information related to the sales transaction, such as information about the purchased products, and optionally, information about the customer and method of payment is collected by the point of sale device and stored by computer systems maintained by the merchant.

The customer may return a previously purchased item under return policies specified by the merchant. For example, the purchased item may be defective or deemed otherwise unsuitable by the customer, and the merchant may accept the item for return, provided the customer follows return policy rules. Typically, the customer returns one or more items at a point of return device (e.g., a register configured for accepting returns), generally operated by a store employee. Information related to the return transaction, such as information about the returned items, and optionally, information about the returning customer is collected by the point of return device.

Some return policies use information related to returned items as a factor in authorizing a return. For example, return policy rules may specify that a certain category of items is to be accepted for credit, and another category of items is to be accepted for an exchange. Specific return policy rules are generally created by the merchant to allow legitimate item returns and to discourage return fraud or abuse of the return policy.

Return fraud is occasionally perpetrated by customers or employees in a retail environment. For example, a customer may attempt to return a stolen item or an item purchased from another merchant. Specialized or dynamic return policies implemented by a computer system can contribute to reducing incidents of return fraud or return policy abuse.

SUMMARY

In one embodiment, a point of return device can be configured to gather information related to a return request and a returning customer. Upon providing the information to an authorization server, the server can identify historical transaction data of the returning customer from data stored in a repository. Based on the historical transaction data and on the return request, the authorization server determines a return authorization decision based on an item-level return policy, another decision based on customer-specific return privileges, and optionally, another authorization decision based on registry-related return privileges. Upon processing the return request based on a selected return authorization decision, data representative of the processed return request is optionally stored in the repository to update the previously identified customer transaction data.

Optionally, the historical transaction data includes the values of previous purchases and the values of previous returns by the returning customer. For example, a net spending amount may be calculated for the returning customer using the previous purchase and return values. As another option, determining one or more return authorization decisions is also based on attributes of items included in the return request. For example, the product value, category, condition, purchase date, and return date of one or more items may be considered. As another option, determining one or more return authorization decisions is also based at least in part on the period of time between an item purchase and the corresponding return request. For example, a return may be approved if requested within a certain period of time. Optionally, one or more return authorization decisions may be based on configurable return policy rules, enabling return authorization decision and selection processes to adapt to changing business conditions.

In another embodiment, the authorization server can also receive information related to a registry associated with the returning customer. For example, the registry may include one or more registry items, and determining an authorization decision based on registry-related return privileges may also be based at least in part on aspects of the registry or the included registry items. Optionally, the registry aspects may include a registry creation date, the product categories of items included in the registry, the value of items included on the registry, and the value of previously purchased registry items. As another option, the authorization server can also receive information representative of a customer having purchased one or more of the registry items and can identify historical transaction data of the purchasing customer from data stored in a repository. For example, determining the authorization decision based on registry-related return privileges may also be based at least in part on historical transaction data of the purchasing customer.

The details of one or more implementations are set forth in the accompanying drawing and description below. Other features, objects, and advantages will be apparent from the description and drawings, and from the claims.

DESCRIPTION OF DRAWINGS

Like reference symbols in the various drawings indicate like elements.

DETAILED DESCRIPTION OF ILLUSTRATIVE IMPLEMENTATIONS

Illustrative implementations of computer-based systems and methods for managing customer returns in a retail environment are described. The described systems and methods enable a flexible implementation of merchant return policies based on several factors, including, but not limited to, product attributes, customer characteristics, and temporal aspects of a return request. Rather than framing return policy decisions purely in binary terms (i.e., whether to allow or disallow a return), return privileges are systematically reduced after an initial set of return privileges are exhausted. For example, by defining multiple return privilege tiers in the context of a retail returns system, a retail customer can access general return privileges, or additional privileges based on additional qualifications. The additional privileges, for example, are implemented upon exhaustion of the general privileges. Flexible or customized return privileges provide an improved experience for customers by enabling the customers to return merchandise under acceptable circumstances. Incentives for abusive or fraudulent returns are diminished by intelligently reducing return privileges, yet not eliminating the privileges entirely. Additionally, the return process is simplified for retail employees by implementing a system-driven process.

Figure 1:
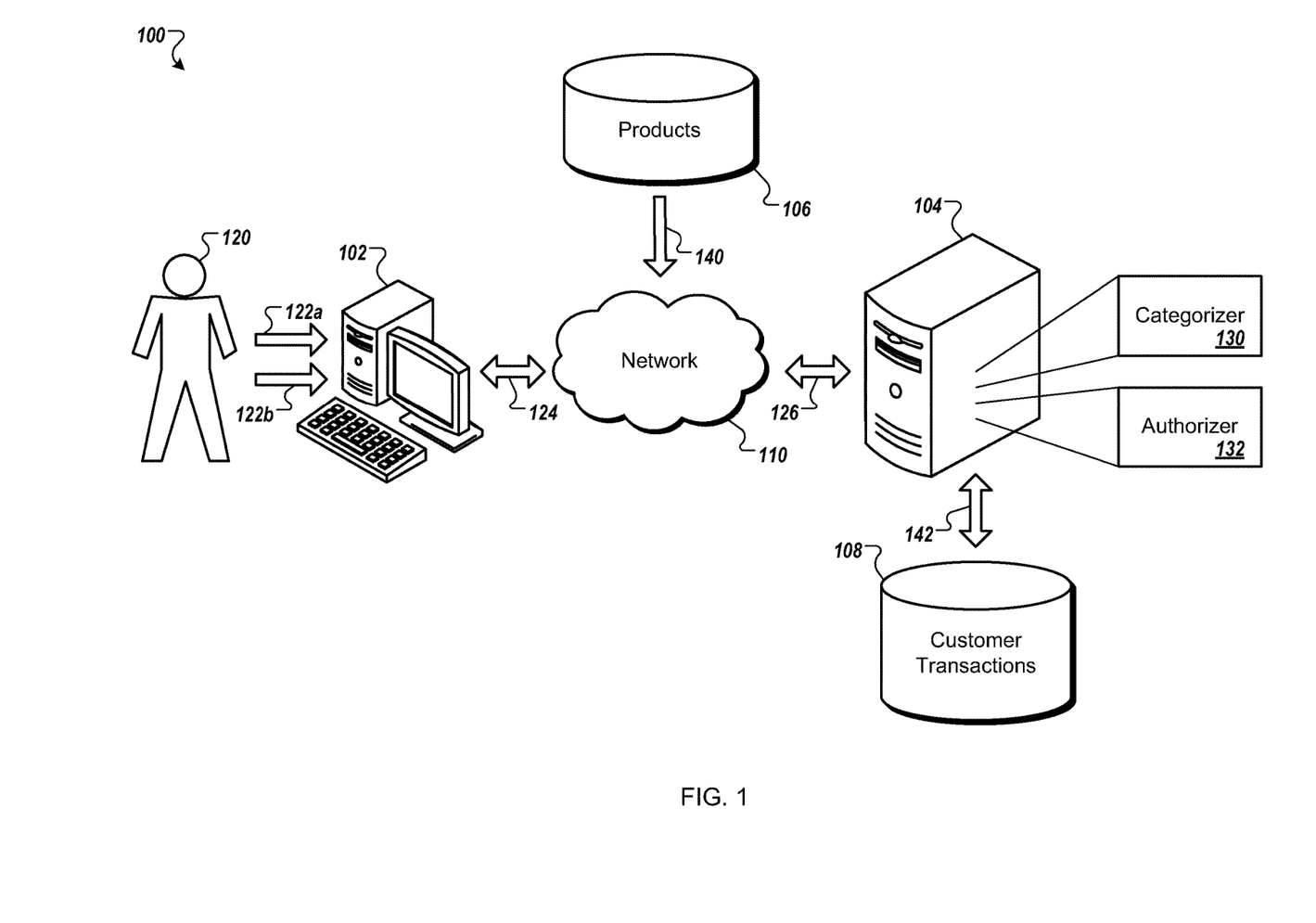
FIG. 1 shows an example system for managing return requests.

Referring to FIG. 1, an example returns system 100 for managing return requests is shown. In some configurations, the returns system 100 includes components such as a sales and returns client device 102, a sales and returns processing server 104, a products data server 106, and a customer transactions data server 108. Components in the system 100 communicate via a network 110 using wired or wireless protocols, or a combination thereof.

As shown, a customer 120 provides a transaction request 122(a-b) to the sales and returns client device 102. For example, the client device 102 (e.g., a point of sale device, a point of return device, etc.) is operated by an employee handling the transaction request 122(a-b) (e.g., a purchase request, a return request, etc.) for the customer 120. As shown, the client device 102 includes one or more peripheral devices, including input devices (e.g., keyboards, scanners, etc.), output devices (e.g., display monitors, printers, etc.), computer processors (e.g., single-threaded CPUs, multi-threaded CPUs etc.), and memory devices (e.g., RAM, hard drives, etc.). For example, information related to the customer 120 or the transaction request 122 is provided to the client device 102 using one or more input peripherals.

As shown by communication arrows 124 and 126, information provided to the sales and returns client device 102 is sent to the sales and returns processing server 104. The sales and returns processing server 104 includes one or more memory devices (e.g., RAM, hard drives, etc.) and computer processors (e.g., single-threaded CPUs, multi-threaded CPUs, etc.) to store and perform computer-based instructions for managing customer returns and implementing return policy rules, for example. For example, the policy rules may be specified by management and may be configurable to enable the returns system 100 to adapt to changing business conditions. To provide operations, the sales and returns processing server 104 includes one or more software modules such as a categorizer 130 and an authorizer 132, for example. However, in some arrangements, the functionality of one or both of the modules may be incorporated into a hardware system or a combination of hardware and software. Further, while two distinct modules (i.e., the categorizer 130 and the authorizer 132) are illustrated, in some arrangements the functionality of the modules may be combined into a single module or may be distributed across additional modules (e.g., three or more). Optionally, functional aspects of the categorizer 130 or the authorizer 132 are performed by the sales and returns client device 102, alone or in concert with the sales and returns processing server 104.

A plurality of data sources provide information to enable the returns system 100 to implement return policy rules. For example, as shown by communication arrow 140, the products data server 106 stores and provides information related to products offered by a retailer. Such information includes, for example, product identification, return policy information related to the product, product categorization and classification, pricing information, inventory levels, seasonal aspects, reported defect history, return history, and the like. Product information is provided to the sales and returns processing server 104 to assist operations of the categorizer 130 and the authorizer 132. Optionally, product information is provided to the sales and returns client device 102. Product information may be provided by the products data server 106 in batch form (e.g., a daily data batch, a weekly batch, etc.), may be provided in real time (e.g., a web service, etc.) or may be provided by a combination of techniques. As shown by communication arrow 142, for example, the customer transactions data server 108 stores and provides information related to previous customer purchases and returns. Optionally, customer transaction data is stored and provided by a plurality of servers, for example, a data server for customer identification information, another data server for information related to customer purchases, and another data server for information related to customer returns, etc. Customer transaction information is provided to the sales and returns processing server 104 to assist operations of the categorizer 130 and the authorizer 132. Optionally, customer transaction information is provided to the sales and returns client device 102. Customer transaction information may be provided by the customer transactions data server 108 in batch form, in real time, or by a combination of techniques. Upon implementation of return policy rules by the categorizer 130 and the authorizer 132, information related to an authorization decision is provided to an operator of the client device 102 (e.g., an employee) using one or more output peripherals (e.g., a display device).

To illustrate operations of the returns system 100, in an example scenario, the customer 120 purchases one or more items from the retailer. As shown, transaction request 122a (i.e., a purchase request) is provided by the customer 120. Information related to the purchase (e.g., time of purchase, items purchased, sales promotional details, method of payment, employee handling the transaction, etc.) is gathered at the sales and returns client device 102. Optionally, information identifying the customer 120 is provided. The customer 120 is identified using data associated with a method of payment (e.g., a credit card, debit card, check, etc.) to retrieve customer identification information from a third-party server (not shown), for example. As another example, an identification card or store-issued card is provided by the customer 120. As shown by communication arrows 124 and 126, information related to the customer 120 and the purchase transaction request 122a is received by the sales and returns processing server 104. As shown by communication arrow 142, the sales and returns processing server 104 stores the purchase transaction information and associated customer information in the customer transactions data server 108. A history of customer transactions, including previous purchases and returns, is stored and provided by the customer transactions data server 108, and can be used for subsequent authorization decisions.

Referring again to the example scenario, the customer 120 provides transaction request 122b (i.e., a return request) to return one or more previously purchased items. Similar to transaction request 122a (i.e., the purchase request), information identifying the customer 120 is provided. Information related to the return request (e.g., time of return, attributes of items returned, availability of a receipt, employee handling the transaction, etc.) is gathered at the sales and returns client device 102. Item attributes include, but are not limited to, category (e.g., clothing, food, electronic, media, sporting equipment, home and garden, etc.), value (e.g., regular price, sale price, etc.), condition (e.g., defective, damaged, new or used, opened or sealed packaging, etc.), method of purchase (e.g., credit, cash, in-store, online, etc.), and time of purchase.

In some implementations, one or more item attributes are used as factors for determining an authorization decision. For example, an item category is used as a factor. It may be specified, for example, that the return of a particular classification of items (e.g., food) is to be generally allowed in the form of cash or credit, and that another classification of items (e.g., collectables) is to be disallowed. As another example, an item category and item condition are used as factors. It may be specified, for example, that the return of a classification of items (e.g., clothing) of a particular condition (e.g., new) is to be generally allowed in the form of an exchange, but of another condition (e.g., used) is to be disallowed. As another example, an item category, item value, time of purchase, method of purchase, time of return, and availability of receipt are used as factors. It may be specified, for example, that the return of a classification of items (e.g., sporting equipment, surfboards, etc.) purchased for a particular value (e.g., regular price) at a particular time (e.g., the beginning of summer) using a particular purchase method (e.g., a check) without a receipt is to be generally allowed in the form of credit for the current item price (e.g., a clearance price) at the time of return (e.g., the end of summer). With a receipt, for example, the return of a classification of items is to be generally allowed in the form of credit for the purchase price of the item (e.g., regular price).

In some implementations, a product defect history is used as a factor for determining an authorization decision, alone or in combination with one or more item attributes. Optionally, the product defect history is associated with return transaction information for a product, provided by the customer transactions data server 108. As another option, the product defect history is associated with product information provided by the products data server 106. A particular item may be determined to be associated with a high or low defect rate by analyzing the product defect history, for example. It may be specified, for example, that the return of a defective item with a prevalent history of defects (e.g., a particular lawn mower model) with a receipt is to be generally allowed in the form of cash, credit, or exchange, but without a receipt is to be generally allowed in the form of an exchange for another item of a similar category or from a similar department.

Factors included in the previously described examples and variations thereof can be used as bases for item-level policy rules pertaining to the handling of return requests, the rules based at least in part on a set of attributes of one or more items included in a return request. For example, the item-level policy rules are configurable to enable the categorizer 130 and the authorizer 132 to adapt to changing business conditions and to reflect management decisions. Optionally, the item-level rules are used as the basis for a set of item-level return privileges. As another option, the item-level rules are used in conjunction with purchase and return characteristics of the customer 120 to form the basis of a set of customer-specific return privileges. As another option, selecting an application of the item-level or customer-specific privileges is based at least in part on a determined authorization of the item-level privileges and the customer-specific privileges. For example, it may be determined for handling a particular return request that an authorization of item-level privileges is approved and an authorization of customer-specific privileges is denied (or vise-versa). As another example, it may be determined that an authorization of customer-specific privileges results in a reduction of subsequent customer return privileges, and an authorization of item-level privileges does not result in a reduction. Optionally, selection from one or more authorization decisions is based at least in part on authorization approval. As another option, selection from one or more authorization decisions is based at least in part on a preservation of customer return privileges.

Return privileges include aspects related to the implementation of return policy rules and authorization decisions. Optionally, return privileges include, but are not limited to, aspects such as time (e.g., an allowable number of days between purchase and return), value (e.g., an allowable value of one or more items to be returned), number (e.g., an allowable number of return transactions), category (e.g., an item classification to be accepted for return), condition (e.g., an item condition to be accepted for return), method of return (e.g., cash, credit, exchange, etc.), and provision of a receipt. Return privileges of one or more customers are configurable and variable, based on management decisions and on particular customer characteristics. For example, a particular customer, grouping of customers, or categorization of customers are designated to receive advanced or reduced return privileges. To list a few possibilities, one or more customers may be allowed a greater or lesser number of days between purchase and return, a greater or lesser value of items to be returned, a greater or lesser number of return transactions, a broader or narrower range of product categories to be accepted for return, a better or worse condition of items to be accepted for return, a broader or narrow range of acceptable return methods, or an optional or non-optional provision of a receipt. As another example, return privileges are defined to combine one or more aspects. To describe a possibility, one or more customers may be allowed a greater number of days between purchase and return with the provision of a receipt, and a lesser number of days between purchase and return without a receipt. To describe another possibility, one or more customers may be allowed to return a broad range of product categories for an exchange, and a narrow range of product categories for cash. The previously described possibilities are illustrative, as additional return privileges can also be defined and implemented.

As shown by communication arrows 124 and 126, in the present example scenario, the sales and returns processing server 104 receives data associated with the customer 120 and data related to the return transaction request 122b from the sales and returns client device 102. Using customer identification information, for example, the sales and returns processing server 104 retrieves purchase and return characteristics of the customer 120 from the customer transactions data server 108. The customer purchase and return characteristics are based on item attributes (e.g., value, category, condition, time of purchase, method of purchase, etc.) and transaction attributes (e.g., time of return, availability of a receipt, employee handling the transaction, etc.) from previous purchase and return transactions.

In some implementations, a plurality of advanced, general, or reduced return privileges are calculated (e.g., by the categorizer 130 and the authorizer 132) using the customer purchase and return characteristics. For example, the customer purchase and return characteristics include the value of one or more items previously purchased and the value of one or more items previously returned by the customer 120. Optionally, the value of all items purchased and the value of all items returned over a particular period of time (e.g., six months, one year, five years, etc.) are retrieved from the customer transactions data server 108 to determine spending and return patterns for the customer 120. For example, a set of advanced return privileges is calculated for customers associated with a net spending amount (i.e., value of purchases less value of returns) of a certain value (e.g., $10,000 or above, $2,000 or above, $500 or above, etc.) over a certain period of time (e.g., six months, one year, five years, etc.). Additionally, for example, a set of general return privileges or reduced return privileges is calculated for customers associated with a lesser spending amount over a similar period of time.

Determining one or more return authorization decisions and selecting from among the decisions (e.g., by the authorizer 132) is based at least in part on the customer purchase and return characteristics. For example, the customer purchase and return characteristics include the period of time between a purchase and a return of one or more items by the customer 120. As another example, the customer purchase and return characteristics include the provision of a receipt by the customer 120. Optionally, the period of time between the purchase and return is determined from the receipt. As another option, the period of time between the purchase and return is determined with or without a receipt by retrieving related information from the customer transactions data server 108, using customer and item identifiers. In some implementations, determining one or more authorization decisions is based on the period of time between the purchase and return and on the provision of the receipt. For example, for a customer with a certain level of net spending (e.g., $2000 or above over a one year period), the customer may return an item with or without a receipt. If a receipt is provided, for example, within a certain number of days (e.g., 30, 60, 120, etc.), an application of one tier of privileges (e.g., privileges associated with an item-level policy) is selected. If a receipt is not provided, for example, an application of another tier of return privileges (e.g., advanced privileges) is selected. For example, advanced return privileges include a base value of allowable returns (e.g., $50, $100, $500, etc.) over a certain period of time (e.g., six months, one year, two years, etc.). Optionally, advanced return privileges include a progressive adjustment based on one or more customer purchase and return characteristics. For example, advanced return privileges include an additional variable value (e.g., 1%, 2%, 5%, 10%, etc.) of net spending for allowable returns, in addition to the base value. Optionally, upon exhaustion of advanced return privileges (e.g., when the value of returned items over a certain period exceeds the value of allowable returns), general or reduced privileges are applicable.

Referring again to the example scenario, the sales and returns processing server 104 processes the transaction request 122b (e.g., return request). For example, based purchase and return characteristics of the customer 120, information related to the transaction request 122b, and return policy rules, the sales and returns processing server 104 (and, optionally, the sales and returns client device 102) performs one or more algorithms for generating, selecting, and implementing an authorization decision. As shown by communication arrows 126 and 124, information related to the decision is provided via the network 110 to the sales and returns client device 102, where an employee completes the transaction. Optionally, the sales and returns client device 102 overrides the sales and returns processing server 104, for example, based on item-level return policies and transaction data. As shown by communication arrow 142, information related to the completed transaction is stored in the customer transactions data server 108. For example, the value of one or more returned items is considered in subsequent net spending calculations for the customer 120. As another example, the value of a returned item is deducted from the value of allowable returns included in one or more sets of return privileges associated with the customer 120.

Figure 2:
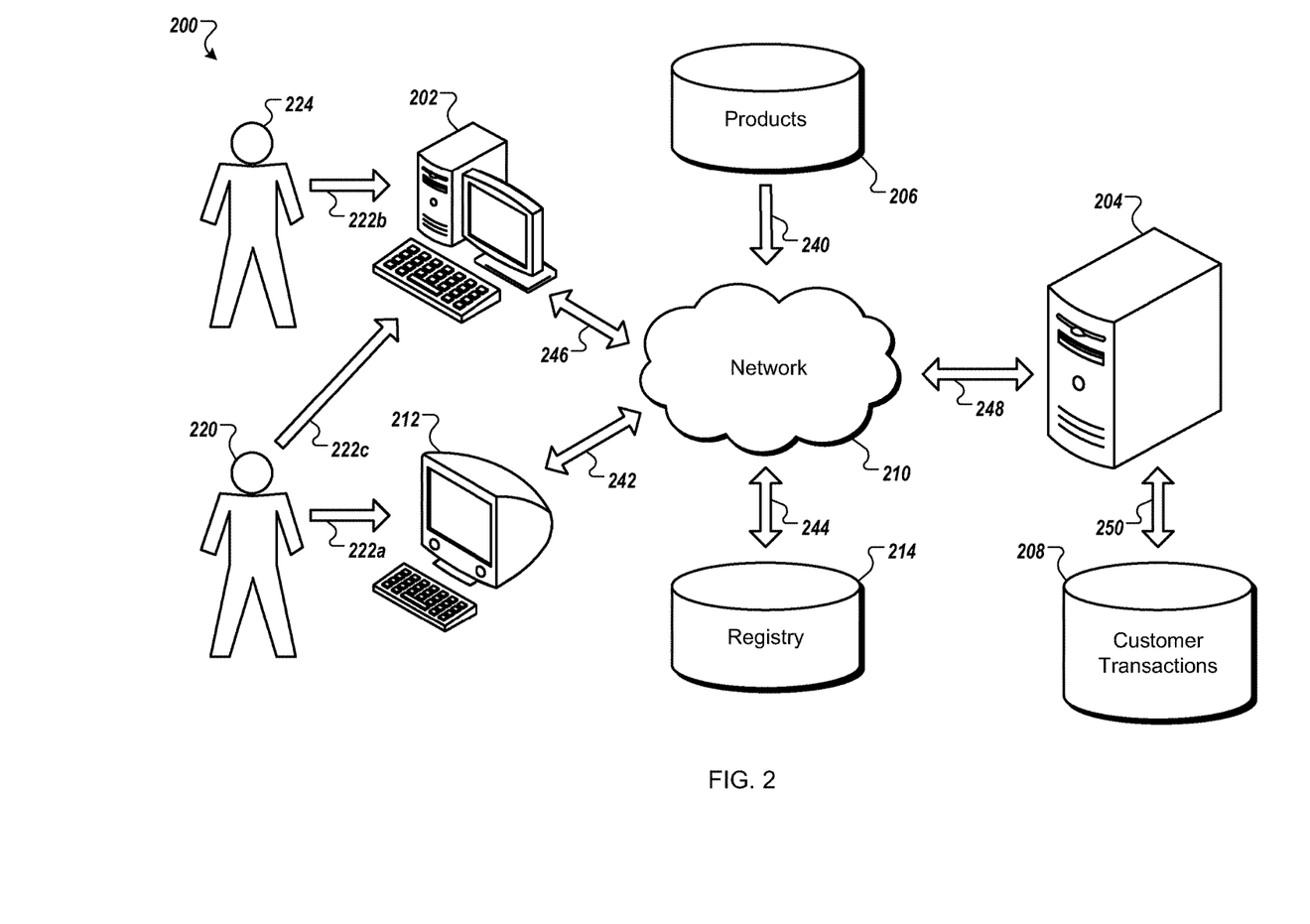
FIG. 2 shows an example system for managing return requests for items associated with a registry.

Referring to FIG. 2, an example returns system 200 for managing return requests for registry items is shown. In some configurations, the returns system 200 includes components such as a sales and returns client device 202, a sales and returns processing server 204, a products data server 206, a customer transactions data server 208, a registry client device 212, and a registry data server 214. Components in the returns system 200 perform similar operations as analogous components in the returns system 100 (shown in FIG. 1). For example, the sales and returns client device 202 performs similar operations as the sales and returns client device 102, the sales and returns processing server 204 performs similar operations as the sales and returns processing server 104, the products data server 206 performs similar operations as the products data server 106, and the customer transactions data server 208 performs similar operations as the customer transactions data server 108. As shown, components in the system 200 communicate via a network 210 using wired or wireless protocols, or a combination thereof.

Similar to the returns system 100, the returns system 200 performs one or more algorithms for generating, selecting, and implementing an authorization decision. Also similar to the returns system 100, the returns system 200 generates, selects, and implements the decision based on customer purchase and return characteristics, information related to one or more transaction requests, and configurable return policy rules. Additionally, the system 200 generates, selects, and implements the decision based on one or more aspects of a registry. To provide operations, the sales and returns processing server 204 (and, optionally, the sales and returns client device 202) includes one or more software modules (e.g., the categorizer 130 and the authorizer 132, shown in FIG. 1).

To illustrate operations of the returns system 200, in an example scenario, a registry customer 220 provides a transaction request 222a to the registry client device 212 to create a list of items to be included on a registry (e.g., a gift registry for a wedding, baby shower, etc.). The registry client device 212 includes one or more peripheral devices, including input devices (e.g., keyboards, computer mice, touch screens, etc.), computer processors (e.g., single threaded CPUs, multi-threaded CPUs, etc.), and memory devices (e.g., RAM, hard drives, etc.). Optionally, as shown by communication arrows 240 and 242, data related to items available as registry list selections is provided by the products data server 206 to the registry client device 212. For example, to create a registry list, one or more available items are selected by the registry customer 220 using one or more input peripherals of the registry client device 212. As shown by communication arrows 242 and 244, data related to the registry list is provided to the registry data server 214. For example, the status (e.g., available, not available, purchased, not purchased, quantity purchased, etc.) of one or more registry list items is updated and maintained by the registry data server 214, based on information related to one or more transaction requests.

Customers may reference the registry list and purchase one or more included items for the registry customer 220 (e.g., as a gift). As shown, a purchasing customer 224 provides a transaction request 222b (i.e., a registry item purchase request) to the sales and returns client device 202 to purchase one or more items included on the registry list. For example, the purchasing customer 224 obtains a copy of the registry list and presents the copy to an employee handling the transaction request 222b at the sales and returns client device 202. Information related to the purchase (e.g., time of purchase, items purchased, sales promotional details, method of payment, employee handing the transaction, etc.) is gathered at the sales and returns client device 202, in addition to information related to the registry list (e.g., a registry list identifier, a registry list item identifier, etc.). Optionally, information identifying the purchasing customer 224 is provided. The customer 224 is identified using data associated with a method of payment to retrieve customer identification information from a third-party server. As another example, an identification card or store-issued card is provided by the customer 224. As shown by communication arrows 246 and 244, data related to the registry list, the transaction request 222b, and optionally, the purchasing customer 224 is provided to the registry data server 214. The registry data server 214 uses a registry list identifier and one or more item identifiers to update the status (e.g., from "not purchased" to "purchased") of one or more registry list items, for example, to assist subsequent customers in not making a similar registry item purchase. As another example, one or more registry list items are identified as having been purchased by the purchasing customer 224. As shown by communication arrows 246 and 248, data related to the purchasing customer 224, the transaction request 222b, and optionally, the registry list is also received by the sales and returns processing server 204. As shown by communication arrow 250, the sales and returns processing server 204 stores the purchase transaction data, the associated customer information, and optionally, the registry list information in the customer transactions data server 208. A history of customer transactions, including previous purchases and returns, is stored and provided by the customer transactions data server 208, and can be used for subsequent authorization decisions.

Referring again to the example scenario, the registry customer 220 provides transaction request 222c (i.e., a return request for one or more registry list items). Information related to the return request (e.g., time of return, attributes of items returned, availability of a receipt, employee handling the transaction, etc.), identification information related to the registry customer 220, and information related to the registry list is gathered at the sales and returns client device 202. As shown by communication arrows 246 and 248, the sales and returns processing server 204 receives the data provided by the sales and returns client device 202. Using customer identification information, for example, the sales and returns processing server 204 retrieves purchase and return characteristics of the registry customer 220 from the customer transactions data server 208. Optionally, as shown by communication arrows 240 and 248, the processing server 204 receives additional data provided by the products data server 206. As another option, as shown by communication arrows 244 and 248, the sales and returns processing server 204 receives registry information from the registry server 214. For example, if the registry customer 220 is identified as being associated with one or more registries, one or more registry list identifiers or one or more registry item identifiers are used by the registry server 214 to provide related registry information. The status (e.g., purchased, not purchased, etc.) of one or more registry items is provided by the registry server 214, and optionally, identification information related to the purchasing customer 224 is provided in association with items purchased by the customer 224. In some implementations, as shown by communication arrow 250, the sales and returns processing server 204 receives purchase and return characteristics of the purchasing customer 224 from the customer transactions data server 208.

In some implementations, based at least in part on one or more aspects of a registry, the returns system 200 generates one or more return authorization decisions, selects from the decisions, and processes a return based on the selected decision. Optionally, registry aspects used in an authorization decision include, but are not limited to, the creation date of the registry, the value of one or more items included on the registry, the value of one or more purchased items included on the registry, the product category of one or more items included on the registry, and the refund history of items included on the registry.

In some implementations, a plurality of advanced, general, or reduced registry-related return privileges are calculated (e.g., by the categorizer 130 and the authorizer 132, shown in FIG. 1) using the registry aspects and the customer purchase and return characteristics. For example, a set of general return privileges is calculated for customers associated with a certain level of net spending (e.g., less than $1000, less than $700, less than $500, etc.) over a certain period of time (e.g., two years, one year, six months, etc.) and having not created a registry within a certain period of time (e.g., three months, six months, one year, etc.). The general return privileges include, for example, allowing the customer a certain value amount (e.g., $100, $70, $50, etc.) for returned items over a certain period of time (e.g., two years, one year, six months, etc.), with or without a receipt, upon the provision of customer identification (e.g., an identification associated with a gift purchase log). As another example, a set of advanced return privileges is calculated for customers associated with similar purchase and return characteristics, and having created a registry within a certain period of time (e.g., two years, one year, six months, etc.). One set of advanced return privileges include, for example, allowing the customer (e.g., the registry customer 220) a certain value amount (e.g., unlimited, $5,000, $1000, etc.) for returned items purchased from the registry. Another set of advanced return privileges include, for example, allowing the customer another value amount (e.g., $500, $300, $150, etc.) for returned items not purchased from the registry. Optionally, the return of one or more registry items without a receipt is limited to a configurable percentage of purchases against the registry. For example, another set of advanced return privileges include allowing the customer 220 to return registry items of a certain percentage value (e.g., 2%, 5%, 10%, etc.) of the total value of registry items purchased by one or more purchasing customers (e.g., purchasing customer 224). Optionally, upon exhaustion of advanced return privileges (e.g., when the value of returned items over a certain period exceeds the value of allowable returns), general or reduced privileges are applicable.

In some implementations, determining one or more return authorization decisions and selecting from the decisions (e.g., by the authorizer 132, shown in FIG. 1) is based at least in part on the registry aspects. Optionally, selecting from the decisions is based on a value of previously purchased items included on the registry. For example, registry return privileges may not apply until a certain minimum total value (e.g., $250, $500, $1000) of registry items has been purchased. As another option, selecting from the decisions is based at least in part on an inclusion of one or more registry items in a request for return. For example, if the registry customer 220 requests to return one or more registry items (e.g., items purchased by the purchasing customer 224) without a receipt, an application of a particular set of calculated return privileges is selected (e.g., advanced privileges associated with the return of registry items). Optionally, if a selection of non-registry related privileges (e.g., privileges related to an item-level policy) is a possibility, the other privileges may instead be selected, under certain circumstances. For example, if the registry customer 220 provides a receipt for a damaged registry item of a particular category (e.g., a product category associated with a defect history), selecting a return authorization decision based on registry-related return privileges may reduce subsequent registry-related return privileges for the customer (e.g., by decreasing the allowed return value amount). Instead, for example, item-level privileges may be selected and applied, resulting in no reduction or a lesser reduction of subsequent registry-related return privileges (i.e., a preservation of return privileges). Optionally, selecting the authorization decision is also based at least in part on characteristics and return characteristics of the purchasing customer 224. For example, if the customer 224 is associated with a certain net spending amount (e.g. over $5000, over $2000, over $1000, etc.) for a certain period of time (e.g., six months, one year, two years, etc.) and is associated with a low rate of returns (e.g., 1%, 2%, etc.), an advanced set of customer-specific return privileges may be calculated and selected for the returning customer 220. As another example, if the customer 224 is associated with a lower net spending amount and a higher rate of returns, a reduced set of customer-specific return privileges may be calculated and selected for the returning customer 220.

Referring again to the example scenario, the sales and returns processing server 204 processes the return transaction request 222c. For example, based on purchase and return characteristics of the registry customer 220, (and optionally, the purchasing customer 224), the return transaction request 222c, configurable return policy rules maintained by the returns system 200, and one or more aspects of a registry associated with the registry customer 220, the sales and returns processing server 204 (and, optionally, the sales and returns client device 202) performs one or more algorithms for generating, selecting, and implementing an authorization decision. As shown by communication arrows 248 and 246, information related to the selected return authorization decision is provided via the network 210 to the sales and returns client device 202, where an employee completes the transaction. As shown by communication arrow 250, information related to the completed transaction is stored in the customer transactions data server 208. For example, the value of a returned registry item is considered in subsequent net spending calculations for the registry customer 220, and optionally, for the purchasing customer 224. As another example, the value of a returned registry item is deducted from the value of allowable returns included in one or more sets of return privileges associated with the registry customer 220, and optionally, with the purchasing customer 224.

Figure 3:
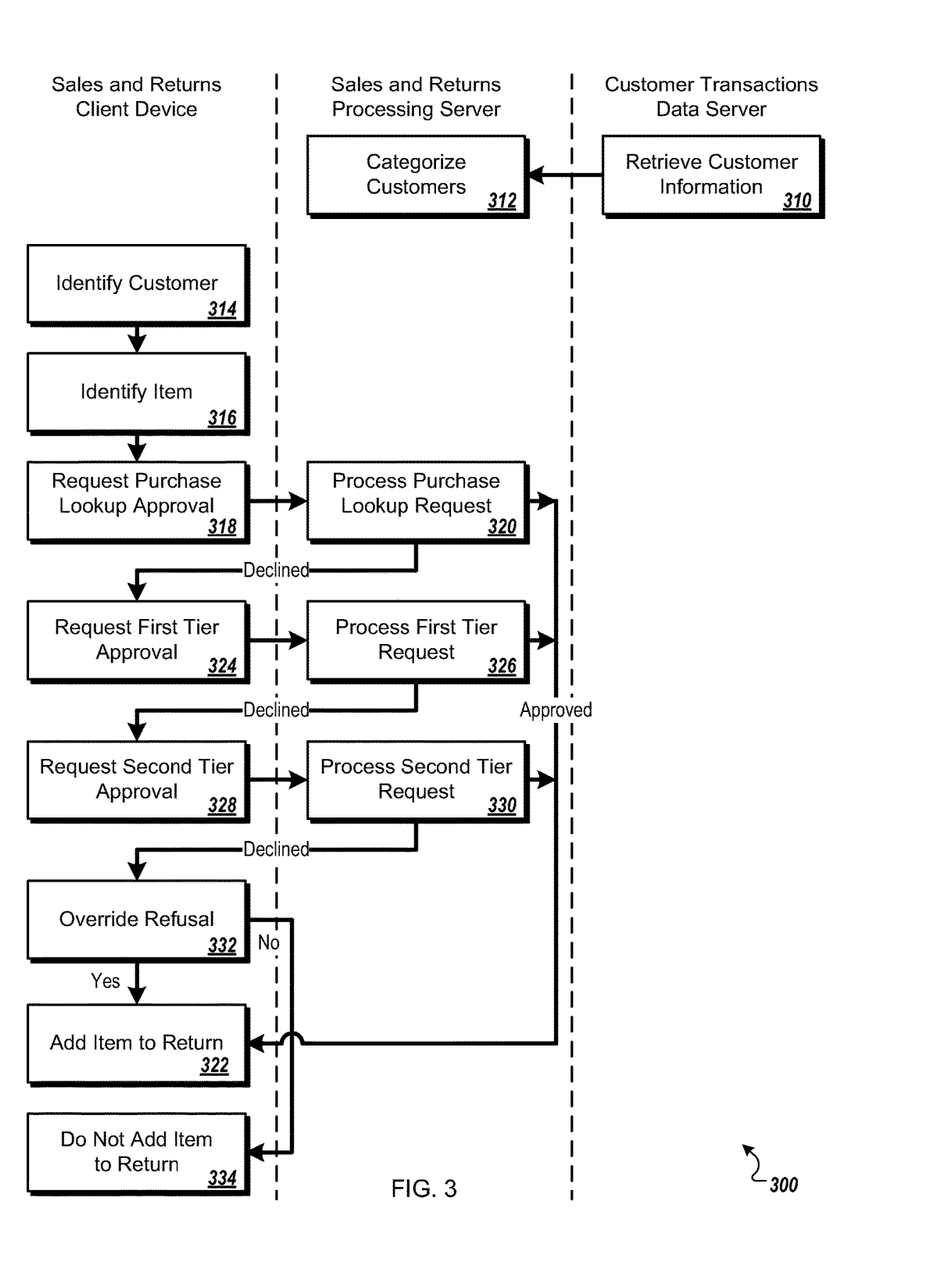
FIG. 3 is a diagram of an example process for categorizing one or more customers and processing a return request.

FIG. 3 is a diagram of an example process 300 for categorizing one or more customers and processing a return request. For example, the process 300 is optionally performed by the returns system 100 as shown in FIG. 1 (e.g., by the categorizer 130 and the authorizer 132). As another example, the process 300 is optionally performed by the returns system 200 as shown in FIG. 2.

In step 310, for example, the returns system 100 retrieves information related to one or more customers from the customer transactions data server 108. For example, the customer information includes purchase and return characteristics based on previous purchase and return transactions. In step 312, the sales and returns processing server 104 (e.g., an authorization server) receives the customer information and categorizes the customer(s). For example, the categorizer 130 performs operations including, but not limited to, determining a net spending amount for a customer, determining a value of one or more items previously returned by the customer, determining one or more categories of items previously returned by the customer, determining the condition of one or more items previously returned by the customer, determining whether a customer is associated with one or more registries, etc. Optionally, one or more determinations are used to by the categorizer 130 to categorize the customer and associate the customer with one or more privilege tiers (e.g., advanced, general, reduced, item-level, customer-specific, registry-related, etc.). As another option, for each privilege tier associated with the customer, the categorizer 130 (or the authorizer 132) calculates particular return privileges available to the customer. For example, if the customer is associated with an advanced privilege tier allowing a return value limit (e.g., $100), and a determination is made that the customer has previously returned one or more items of a particular total value (e.g., $25), the categorizer 130 optionally adjusts the return privileges to reflect previous transactions (e.g., by deducting $25 from the return value limit).

In step 314, the customer is identified at the sales and returns client device 102 (e.g., a point of return device). For example, the customer is optionally identified from an identification card or from a method of payment presented to an employee handing a return transaction at the device 102. In step 316, an item to be returned is identified at the client device 102. For example, the item is optionally identified by scanning a bar code or reading a radio frequency tag associated with the item. As another option, the item is identified by the provision of an associated receipt. In step 318, the client device 102 requests a purchase lookup approval from the processing server 104. For example, the purchase lookup approval is optionally associated with a tier of return policies related to one or more items included in the return request.

In step 320, the processing server 104 (e.g., executing the authorizer 132) processes the purchase lookup request. For example, the customer optionally provides a receipt that can be used to retrieve information about and verify a previous purchase. If a specified tier of return policies for the customer is applicable, based on a successful purchase lookup or on the associated item attributes (e.g., category, value, condition, purchase date, return date, etc.), the processing server 104 optionally approves the return request and provides notification for the client device 102 to add the item to the return (step 322). If a tier of return policies related to the purchase lookup is not applicable, for example, the processing server 104 optionally declines the return request and provides notification to the client device 102.

In step 324, (e.g., upon a declined purchase lookup request), the client device 102 requests an approval of a first tier of return privileges. For example, return privileges generally available to customers (e.g., general return privileges) are optionally requested. In step 326, the processing server 104 processes the request. For example, based on purchase and return characteristics of the customer and one or more aspects of the return request (e.g., provision of receipt, time of return, one or more item attributes, etc.), the processing server 104 optionally approves the return request and provides notification for the client device 102 to add the item to the return (step 322). If the first tier of privileges is not applicable (e.g., because the privileges have been exhausted, based on aspects of the return request, etc.), the processing server 104 optionally declines the return request and provides notification to the client device 102.

In step 328, (e.g., upon a declined first tier request), the client device 102 requests an approval of a second tier of return privileges. For example, return privileges available to certain customers or certain categories of customers (e.g., advanced return privileges, registry-related return privileges, etc.) are optionally requested. In step 330, the processing server 104 processes the request. For example, based on purchase and return characteristics of the customer and one or more aspects of the return request, the processing server 104 optionally approves the return request and provides notification for the client device 102 to add the item to the return (step 322). If the second tier of privileges is not applicable, the processing server 104 optionally declines the return request and provides notification to the client device 102. In some implementations, additional return privilege tiers are optionally available and may be subsequently requested upon refusal of a previously requested tier.

In step 332, the client device 102 enables a device operator (e.g., the employee handling the transaction) to optionally override the refusal. If the operator overrides the refusal, the client device 102 adds the item to the return (step 322). If the operator does not override the refusal, the client device 102 does not add the item to the return (step 334). The process 300 is optionally repeated for each item included in the return request. In some implementations, the steps described in the process 300 are performed in a different order, or optionally take place simultaneously. For example, step 310 (retrieving customer information) may take place at the same time or after 314 (identifying a customer).

Optionally, a plurality of authorization decisions are initially determined, and a selection is made from the determined authorization decisions. For example, the purchase lookup request processing (step 320), the first tier request processing (step 326), and the second tier request processing (step 330) may take place at the same time, or nearly at the same time, and a selection is made based on the results of each process step. The selected return authorization decision (e.g., based on item-level return policies, customer-specific return privileges, registry-related return privileges, etc.) is processed and implemented, for example. As another option, two or more authorization decisions may be combined or determined concurrently. For example, an item-level and a customer-specific policy are optionally considered together as a factor in determining an authorization decision.

Figure 4:
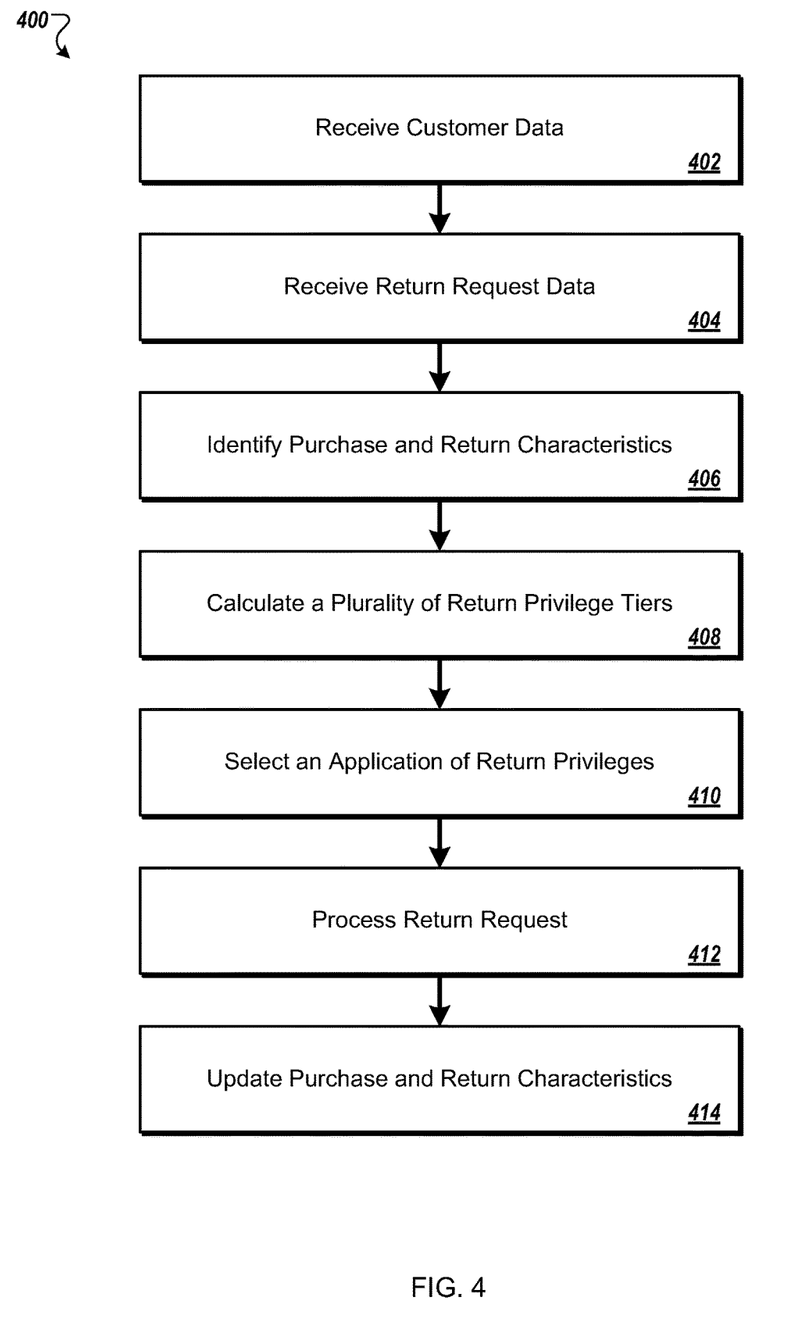
FIG. 4 is a flow chart showing an example process for calculating, selecting, and applying return privileges.

FIG. 4 is a flow chart showing an example process 400 for calculating, selecting, and applying return privileges. The process 400 is optionally performed by the categorizer 130 and the authorizer 132 in the system 100 (as shown in FIG. 1) and will be described as such for clarity. In other implementations, the process 400 may be performed by another system (e.g., the returns system 200). A particular order and number of steps are described for the process 400. However, it will be appreciated that the number, order, and type of steps required for the process 400 is optionally different in other examples.

In step 402, sales and returns processing server 104 receives customer data. For example, the customer data is optionally provided by the sales and returns client device 102.

In step 404, the processing server 104 receives return request data. For example, the request data is also optionally provided by the client device 102.

In step 406, the processing server 104 identifies purchase and return characteristics. For example, a customer identifier (e.g., an identifier associated with the customer data provided in step 402) is optionally provided to the customer transactions data server 108 for retrieving purchase and return characteristics of the customer.

In step 408, the processing server 104 calculates a plurality of return privilege tiers. For example, one or more tiers (e.g., general, advanced, reduced, item-level, registry-related, etc.) are calculated based on return policy rules and purchase and return characteristics of one or more customers.

In step 410, the processing server 104 selects an application of return privileges. For example, based at least in part on one or more attributes included in the return request 122b, and based at least in part on purchase and return characteristics of the customer 120, the authorizer 132 selects an applicable tier of return privileges for the return of one or more previously purchased items. Optionally, the authorizer 132 declines the return request.

In step 412, the processing server 104 (and, optionally, the sales and returns client device 102) processes the return request 122b. For example, an employee handing the return transaction receives an authorization decision on a display device associated with the client device 102 and processes the transaction based at least in part on the decision.

In step 414, the processing server 104 updates purchase and return characteristics. For example, using the customer identifier and information related to the processed transaction, the processing server 104 updates the purchase and return characteristics of the customer 120. Optionally, the updated purchase and return characteristics can be used in subsequent return transactions.

Figure 5:
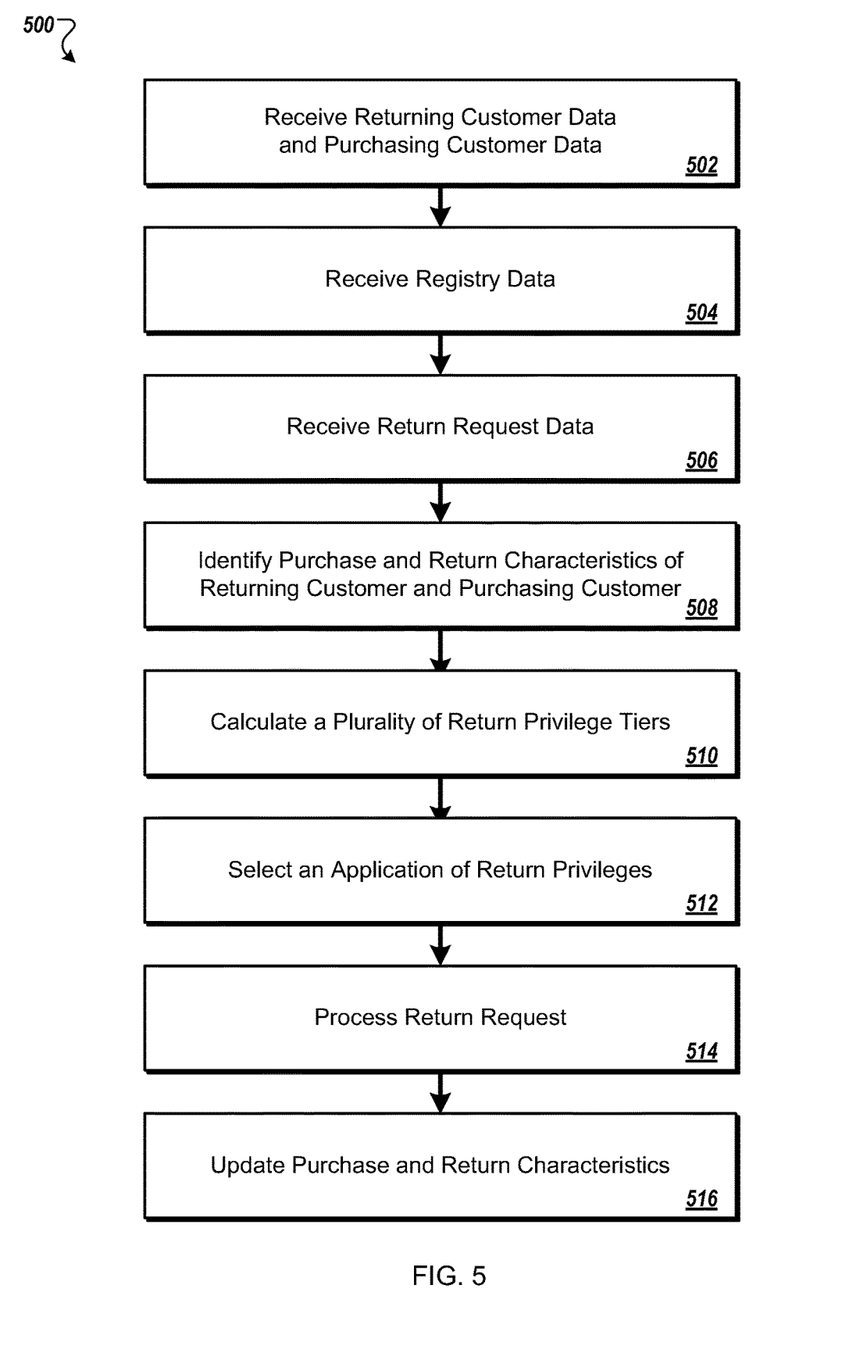
FIG. 5 is a flow chart showing an example process for calculating, selecting, and applying return privileges related to a registry.

FIG. 5 is a flow chart showing an example process 500 for calculating, selecting, and applying return privileges related to a registry. The process 500 is optionally performed by the system 200 (as shown in FIG. 2) and will be described as such for clarity. In other implementations, the process 500 may be performed by another system. A particular order and number of steps are described for the process 500. However, it will be appreciated that the number, order, and type of steps required for the process 500 is optionally different in other examples.

In step 502, sales and returns processing server 204 receives data related to the returning customer 220, and optionally, the purchasing customer 224. For example, the returning customer data is optionally provided by the sales and returns client device 202. Optionally, the purchasing customer data is provided by the customer transactions data server 208.

In step 504, the processing server 204 receives registry data. For example, a registry identifier is provided to the registry data server 214 for retrieving registry information related to the returning customer 220. The registry data optionally includes information related to one or more items included in a registry.

In step 506, the processing server 204 receives return request data. For example, the request data is also optionally provided by the client device 202.

In step 508, the processing server 204 identifies purchase and return characteristics of the returning customer 220, and optionally, the purchasing customer 224. For example, a customer identifier (e.g., an identifier associated with the customer data provided in step 502) is optionally provided to the customer transactions data server 208 for retrieving purchase and return characteristics of the returning and purchasing customers.

In step 510, the processing server 204 calculates a plurality of return privilege tiers. For example, one or more tiers (e.g., general, advanced, reduced, item-level, registry-related, etc.) are calculated based on return policy rules, purchase and return characteristics of one or more customers, and one or more registries associated with the customers.

In step 512, the processing server 204 selects an application of return privileges. For example, based at least in part on one or more attributes included in the return request 222c, based at least in part on purchase and return characteristics of the returning customer 220, and optionally, based at least in part on purchase and return characteristics of the purchasing customer 224, the authorizer 132 (shown in FIG. 1) selects an applicable tier of return privileges for the return of one or more previously purchased items. Optionally, the authorizer 132 declines the return request.

In step 514, the processing server 204 (and, optionally, the sales and returns client device 202) processes the return request 222c. For example, an employee handing the return transaction receives an authorization decision on a display device associated with the client device 202 and processes the transaction based at least in part on the decision.

In step 516, the processing server 204 updates purchase and return characteristics. For example, using the customer identifier and information related to the processed transaction, the processing server 204 updates the purchase and return characteristics of the returning customer 220, and optionally, the purchase and return characteristics of the purchasing customer 224. Optionally, the updated purchase and return characteristics can be used in subsequent return transactions.

Figure 6:
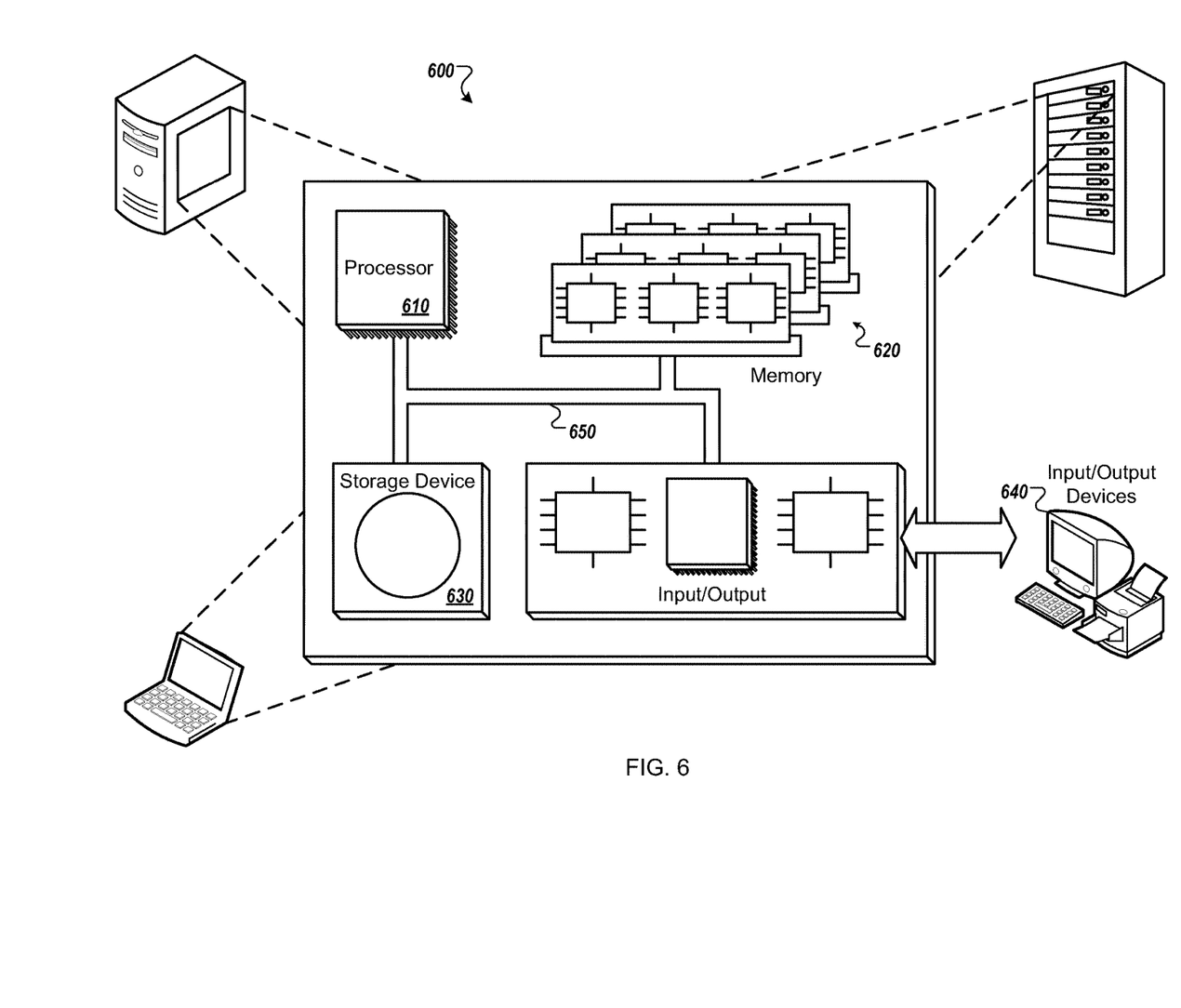
FIG. 6 is a schematic diagram of a generic computing system optionally used in connection with computer-implemented methods described in this document.

FIG. 6 is a schematic diagram of a generic computer system 600. The system 600 is optionally used for the operations described in association with any of the computer-implemented methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 is optionally a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

In some examples, the features described are implemented in digital electronic circuitry, or in computer hardware, firmware, software, or in combinations of them. The apparatus is optionally implemented in a computer program product tangibly embodied in an information carrier, e.g., in a machine-readable storage device or in a propagated signal, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for interaction with a user, the features in some instances are implemented on a computer having a display device such as a CRT (cathode ray tube) or LCD (liquid crystal display) monitor for displaying information to the user and a keyboard and a pointing device such as a mouse or a trackball by which the user provides input to the computer.

The features are optionally implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications are optionally made without departing from the spirit and scope of this disclosure. Accordingly, other embodiments are within the scope of the following claims.

What is claimed is:

1. A computer implemented method for processing a return request, the method comprising:
    receiving data representative of a returning customer;
    receiving data representative of a return request, wherein the return request data is associated with one or more items and includes one or more item identifiers;
    accessing a customer transactions data server and identifying historical transaction data associated with the returning customer from data stored in the customer transactions data server;
    identifying with a sales and returns processing server an item-level return policy associated with the one or more items;
    identifying with the sales and returns processing server a customer-specific set of return privileges selected from a plurality of return privilege tiers, based on the historical transaction data associated with the returning customer, wherein a first return privilege tier includes return privileges for customers having a net spending amount that exceeds a first predetermined value over a predetermined period of time, wherein a second return privilege tier includes increased return privileges for customers having a net spending amount that exceeds a second predetermined value, higher than the first predetermined value, over the predetermined period of time, and wherein a third return privilege tier includes reduced return privileges for customers spending less than a predefined amount over the predetermined period of time;
    optionally identifying a registry-related set of return privileges, based on an association of the returning customer with a gift registry;
    the sales and returns processing server determining a first return authorization decision based on the item-level return policy, the first return authorization decision being a decision to approve or deny the return request;
    the sales and returns processing server determining a second return authorization decision based on the customer-specific set of return privileges, the second return authorization decision being a decision to approve or deny the return request;
    the sales and returns processing server optionally determining a third return authorization decision based on the registry-related set of return privileges, the third return authorization decision being a decision to approve or deny the return request;
    the sales and returns processing server processing the return request based on the first, the second and, if determined, the third return authorization decisions; and
    storing data in the customer transactions data server representative of the processed return request to update the previously identified historical transaction data.

2. The method of claim 1, wherein the historical transaction data includes the value of one or more items previously purchased by the returning customer and the value of one or more items previously returned by the returning customer.

3. The method of claim 1, wherein determining the first return authorization decision is also based on the historical transaction data of the returning customer.

4. The method of claim 1, wherein determining the second return authorization decision is also based at least in part on a set of attributes of one or more items included in the return request, the item attributes including at least one selected from the group consisting of i) product category, ii) value, iii) condition, iv) purchase date, and v) return date.

5. The method of claim 1, wherein determining the first, second, and third return authorization decisions is also based at least in part on a period of time between an item purchase and the return request.

6. The method of claim 1, wherein if the registry-related set of return privileges is identified, the method further comprising receiving registry data and wherein determining the third return authorization decision is also based at least in part on the registry data.

7. The method of claim 6, wherein the registry data includes at least one datum selected from the group consisting of i) date of registry creation, ii) value of items included on the registry, iii) value of previously purchased items included on the registry, and iv) product category of items included on the registry.

8. The method of claim 6, wherein determining the third return authorization decision is also based at least in part on an inclusion of one or more registry items in the return request.

9. The method of claim 6, further comprising receiving data representative of a purchasing customer and identifying historical transaction data of the purchasing customer from data stored in the repository, wherein determining the third return authorization decision is also based at least in part on historical transactions of the purchasing customer.

* * * * *